Oct. 15, 1968

S. UEMURA 3,405,439

METHOD OF MAKING SYNTHETIC RESIN RECEPTACLES

Filed Dec. 16, 1963

INVENTOR.

BY

Oct. 15, 1968          S. UEMURA          3,405,439

METHOD OF MAKING SYNTHETIC RESIN RECEPTACLES

Filed Dec. 16, 1963          2 Sheets-Sheet 2

INVENTOR.

BY

United States Patent Office 3,405,439
Patented Oct. 15, 1968

3,405,439
METHOD OF MAKING SYNTHETIC RESIN RECEPTACLES
Sozaburo Uemura, Otaru-shi, Japan, assignor to Hokkai Seikan Kabushiki Kaisha, Tokyo, Japan
Filed Dec. 16, 1963, Ser. No. 352,703
Claims priority, application Japan, Dec. 18, 1962, 37/76,000; Dec. 21, 1962, 37/78,141; Apr. 11, 1963, 38/17,774, 38/17,775
6 Claims. (Cl. 29—509)

This invention relates to both methods of manufacturing durable, transparent and heat resistant receptacles and to the improved receptacles, such as food cans, formed by such methods.

Hitherto, with reference to transparent receptacles for canned food, through walls of which the content is visible, various propositions have been made. With development of synthetic resin, can-bodies and lids have been made by trial from polyethylenic or vinyl chloride resin, all of which have a disadvantage of being unsuitable for marketing, because such receptacles are not feasible for sterilization above 100° C. In order to overcome these disadvantages, receptacles for which a resin resistant to heat-treatment at a temperature above 100° C., such as polycarbonate excellent in heat-resistant properties as well as mechanical strength, is employed. Even those resins having such properties still have a number of disadvantages, as enumerated below, and could not become marketable products.

Namely, a polycarbonate disc has been employed for making a lid of uniform thickness for a can to contain canned food. The resulting lid has been clamped to a metallic can body to complete a can. When the resulting can has been put in a retort and subjected to heat treatment under pressure for approximately 90 minutes under condition covering heating temperatures ranging from 110 to 115° C. as well as pressure ranging from 8 to 10 pounds, and steam has been discharged for about 15 minutes, and it has been ascertained that the botom of can has swelled out in the retort and exposed the contents of the can to the atmosphere. Also the polycarbonate disc has also swelled out almost semi-spherically. When the can has been rapidly cooled in cool water at 20° C., the upper and lower wall portions of lid body have been found depressed in 3 to 4 minutes, an equally undesirable result.

In such cases, there appear concentric circular and network strain figures, that is, structural changes in the polycarbonate disc. Receptacles including structural changes not only lose commercial value, but also fail to meet the exacting sanitary standards for canned foods.

Studying on this cause, it has been ascertained that it is caused by residual strain of dynamical, internal stress independent of temperature variations (i.e. heating or cooling).

Namely, the strain figure occurring when curling or vacuum sealing is performed, and pressure is imparted on the polycarbonate disc above its elastic limit and the material will be broken, when the polycarbonate disc swells or is depressed by heat-treatment under pressure and cooling treatment. In short, the structural changes due to residual stress occur, and as a result, strain figures become discernible.

One proposed solution for overcoming the above mentioned disadvantages is to increase the thickness of polycarbonate disc. However, if the thickness of disc is increased, residual strains of dynamical, internal stress due to swelling or depressing action may be reduced. This is, therefore, a simple means for solution. However, when such means are resorted to, the cost will be increased making such a method impractical.

As apparent from the foregoing description, the present invention proposes methods of making a receptacle of synthetic resin from which aforementioned various disadvantages may be completely eliminated, the substance of which is as follows: heat resistant, flexible synthetic resin cylindrical body, for instance of polycarbonate, extruded to shape from an extruding machine, cut in predetermined sizes to obtain a receptacle, for instance, a can-body for canned food, the opening edges of upper and lower portions are forced between shaping roller pair, and thereafter said shaping roller pair is revolved or said can-body is revolved, whereby a knife edge form rib and (or) a thick swelling portion is formed. Thus according to the present invention, the synthetic resin tubular body extruded by the extruding machine is cut in predetermined lengths and simultaneously said tubular body is shaped into knife edge shape ribs on both end surfaces necessary for curling or bead bending in order to make apppropriate for mass production. In this case, particularly inthe opening edge of the can-body obtained by cutting in the predetermined lengths synthetic resin material for cans extruded from the extruding machine, clamping ribs of knife edge form are formed by simple operation in a shaping roller mechanism, which in addition are suitable for mass production. All of my methods for mass producing receptacles for canned foods form ribs on the opening edges that possess a knife-edge configuration, as seen in FIGS. 3 and 6-8. This knife-edge configuration enables a lid with a mating shape to be subsequently secured to the receptacle body in a sanitary, leak-proof manner.

Furthermore, in an attempt of homogenizing crystalline conditions of said material for can and in addition of removing residual stress, for instance, when polycarbonate resin is used, annealing treatment is sometimes carried out at a temperature of second transition point of said polycarbonate, 140 to 160% C. for approximately 10 to 15 minutes. In this case, such a treatment can be performed sufficiently only when finished can-body is considered thick enough to retain residual stress inside. The annealing is not necessary for finished can body having a relatively small thickness and no internal stress remained inside thereof. Accordingly, one of the three representative methods of forming receptacle bodies will require the additional step of fabricating a reinforcing bead on the body below the knife-edge rib to provide the additional strength necessary to withstand the stresses caused by annealing operations.

In another method of fabricating the receptacle body of the present invention, a knife edge shaped rib for subsequently clamping to the lids formed by simple mould stand around an opening edge of can-body obtained after cutting a synthetic resin tubular body extruded by an extrusion machine. Moreover, the resulting can-body has similar effects and advantages as in the can-body obtained by my previously described manufacturing processes. Further in order to homogenize crystalline conditions of the material, it is preferable to perform the annealing as referred to above.

In a receptacle for canned food according to the present invention, the content of the receptacle is visible through the surface and bottom to show whether the quality of content is good or bad and its number, even when the periphery of can-body is pasted with labels or given printings. In particular, as the can-body is made of polycarbonate, the present can-body is sufficiently resistant to sterilization under pressure at a temperature of the order of 115 to 112° C. similarly as in the treatment of ordinary metallic can. Furthermore, on account of inherent toughness, mechanical shaping can be sufficiently imparted, the present can-body possesses advantages of being suitable for mass production and vacuum sealing can be performed like in metal goods.

In assembling the can when the lid formed of a similar plastic material is clamped to the polycarbonate can-body, a metallic reinforcing ring is placed over the junction of the lid and knife-edge rim on the can-body. During the subsequent pressurized heating operations for sterilization, the tendency for the plastic to expand is resisted by the metal ring. When the plastic gradually cools after the sterilization procedures, the plastic tends to shrink or contract slightly. Such shrinkage exerts an inwardly directed force against the bent over portion of the metal ring, as seen in FIG. 2, and reinforces the juncture of the lid and the can-body. Consequently, the clamp portion of can-body and lid will be strongly pressed to said reinforcing ring by the action of said recovering force, thereby an advantage of increasing air-tightness and water-proofness being obtained.

Further, according to this invention, since approximately 70 to 80% of the can-body is made of polycarbonate having a specific gravity lower than that of iron, the weight of a whole can-body becomes approximately 20 to 25% lighter than conventional metal cans. Since the edges of the can-body flare outwardly for stability, the can-body is convenient for transmitting and shifting empty cans, thereby reducing the transmission cost. Moreover, particularly, when cans are used for dried food, as the dried food becomes lighter by approximately 80% as compared with the ordinary state, it may be contrary to the original intention of rendering light weight to accommodate food in a heavy metallic can. When a can according to the present invention is used, its object can be accomplished. Moreover, as the upper portion of can-body can be cut with a knife or the like, it will be cut easily without a can opener. There are numbers of advantages, such as, empty cans may be disposed by burning after use, or recovered and reused after sterilization or the like, which can not be achieved by conventional metal cans.

In the following description, the present invention will be further described in detail in connection with one example of embodiment of the present invention illustrated in the accompanying drawings. However, the present invention is not limited by the following descriptions. It is, of course capable of practicing a number of modifications in the range of spirit of this invention, and similar portions may be represented by similar symbols. Said accompanying drawings represent one example of embodiment of the present invention, in which.

Figure 1:
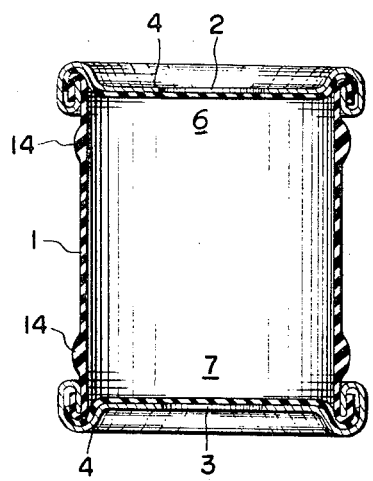
FIG. 1 is a schematic plan view of synthetic resin receptacle for canned food obtainable according to this invention.
Figure 2:
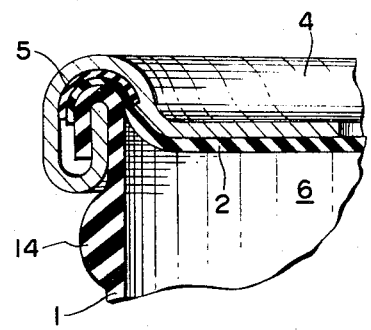
FIG. 2 is an enlarged detailed view of a section of FIG. 1 with an annular gasket added.
Figure 3:
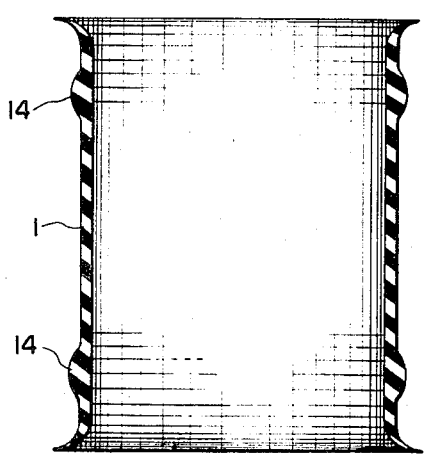
FIG. 3 is an enlarged longitudinal can-body of said receptacle.

Referring to FIGS. 1 and 2, 1 is a can-body extruded from a heat resistant flexible synthetic resin material, for instance, polycarbonate of excellent transparency and metallic toughness; 2 and 3 represent the upper lid body and lower lid body to be injection formed of similar material as that of said can-body; 4 is an annular metallic reinforcing member; 5 is a packing of rubber or the like; 6 and 7 show respectively the upper and lower opening portions of said can-body; the upper lid body 2 and the lower body 3 are arranged respectively on the upper and lower opening positions 6 and 7 of can body 1; and on the outer surfaces of said upper and lower portions, a suitable annular reinforcing member 4 are clamped together with said two lid bodies and with the packing 5 occluded therein.

Figure 6:
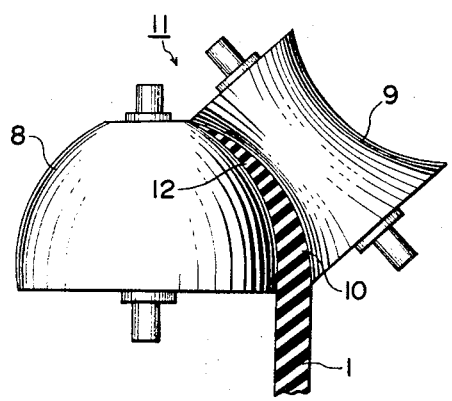
FIG. 6 is a view of one method of forming a rib on the edges of the can-body.
Figure 7:
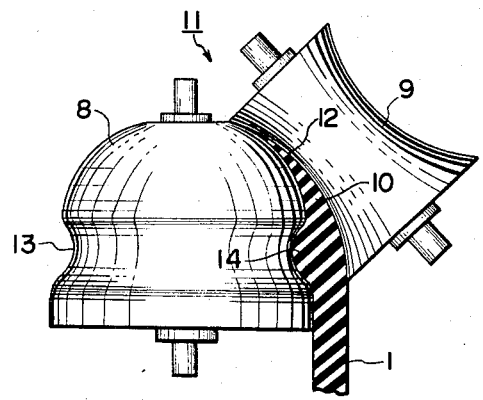
FIG. 7 is a view of a second method of forming a rib and a reinforcing bead on the can-body adjacent thereto.

A preferred novel method of fabricating such plastic can is now described with specific reference to FIGS. 6 and 7. A tubular material extruded through an extruding machine from polycarbonate resin into a blank of can-body is then cut into predetermined sizes to obtain a can-body 1. Then, the upper and lower portions 6, 7 of can-body 1 are forced into an edge-form clearance 10 of a pair of shaping rollers 11 consisting of one arcuated convex surface roller 8 and the other arcuated concave surface roller 9, of which axes are arranged to intercept obliquely as illustrated in FIG. 6, while either said shaping roller pair or the can-body 1 are set in motion to produce relative motion between these surfaces. Then, a knife edge form rib 12 is formed along the periphery of said can-body 1. In this case, sometimes the shaping roller pair 11 may be heated at 140–160° C., the second transition point of polycarbonate resin.

According to another example of embodiment of this invention, as illustrated in FIG. 7 an arcuate groove portion 13 is constructed along a middle body portion of arcuated convex shaping roller 8 and an annular swelled-out portion 14 is formed somewhat below the rib 12 of can-body 1 in one body, which oppresses and releases pull phenomenon at the top of can-body 1 when the metallic lid being clamped and eliminates strain figures entirely at said swelled-out portion. Swelled out portion or bead 14 is desirable to minimize internal stresses when the can-body will undergo annealing or additional heat treating operations.

Figure 8:
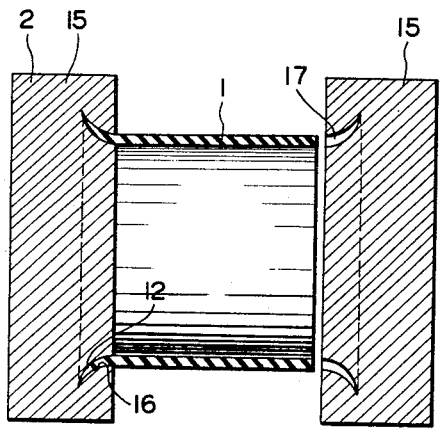
FIG. 8 is a view of a third method of forming a rib on the can-body, this view showing the molds employed with this method.

Furthermore, according to another embodiment of this invention, as illustrated in FIG. 8, a knife edge form rib 12 is formed by using mould stands 14 and 15, along the upper and lower opening edges 6, 7 of can-body 1 obtained by cutting a blank of synthetic resin, for instance, such as polycarbonate resin can material having been extruded from the extruding machine into predetermined size. In this case, each of the mould stands 14 and 15 is provided with a knife edge form annular groove 16 or 17 in order to form a rib 12 of knife edge form on the mould stands 14 and 15, and the can body 1 and mould stands 14, 15 are brought in motion in the direction of arrow. The operation therefor lies in that the upper and lower opening edges 6, 7 of can body 1 are pushed in the annular grooves 16, 17 engraved in the mould stand 14 or 15 under pressure or push therein while hot, to form knife-edge form rib 12 on the periphery of said can-body, and thereafter said can-body is drawn out.

Figure 4:
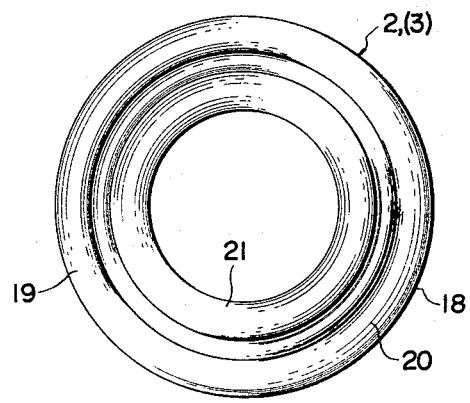
FIG. 4 is a plan view of a lid of the receptacle to be used for said receptacle.
Figure 5:
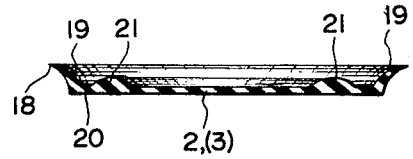
FIG. 5 is a longitudinal sectional view of the lid body.

In the next place, the lid body 2, 3 is formed with knife edge rib 19 along the outer peripheral wall 18 of said lid, as particularly shown in FIGURES 4 and 5, the lid wall 20 from the basic portion of said rib toward inside is somewhat sunk and simultaneously an annular thick swelled portion 21 is integrally formed on the surface of said lid wall somewhat adjacent to said basic portion.

Thus, in the lid body 2, 3 of aforementioned construction, said lid body 3 is formed with knife edge rib 19 around outer peripheral wall 18, and therefore the lid body 3 may be not only clamped simply as compared with hitherto uniform thickness ones, but also may be clamped, of course, by utilizing the already installed equipment. As stretching phenomenon appearing on the outer peripheral portion of lid body 3 in the course of said clamping operation can be oppressed and released by the thick swelled portion 21, no strain figure occurs on said portion. Moreover, when the sterilization under pressure is effected and the lid wall 20 is swell-out, and even if the initial state is still being restored by cooling treatment, no stress will occur by the presence of said thick swelled portion 21. Furthermore, when the lid wall 20 is extruded said thick swelled portion 21 will act as a reservoir for melt; and when the cooling of melt is disturbed, the melt will be uniformly distributed in the knife edged rib 19 and a uniform even thickness of lid wall 20 may be attained, thereby appropriate for mass production.

What I claim:

1. A method for making synthetic resin receptacles, comprising the steps of:
   (a) forming a tubular section from synthetic resin,
   (b) cutting said tubular section to a predetermined length,
   (c) applying pressure to the upper and lower edges of said section to form a flexible outwardly flared knife edge peripheral rib thereon at each end of the section,
   (d) forming a pair of lids from synthetic resin for said section with a flexible outwardly flared knife edge lip thereon, the diameter of said lids being substantially equal to the diameter of the tubular section,
   (e) positioning one of said lids on each end of said tubular section with said ribs in contacting engagement,
   (f) positioning a metallic reinforcing ring atop both of said ribs, the diameter of said ring being greater than the diameter of said tubular section and extending beyond the edges of said tubular section, and
   (g) bending the extending portion of said ring over both of said flexible ribs and into engagement with the exterior surface of said tubular section.

2. The method as defined in claim 1 further including the step of forming a pair of annular reinforcing beads on the exterior surface of said tubular sections simultaneously with the forming of the ribs on said tubular section.

3. The method as defined in claim 1 further including the step of forming an annular bead on the upper surface of said lids simultaneously with the forming of the rib on said lid.

4. The method as defined in claim 1 wherein the step for forming the lips on said tubular section includes passing the edges of said section between a pair of shaping rollers and simultaneously moving said shaping rollers relative to said edges.

5. The method as defined in claim 4 further including the step of heating the shaping rollers prior to contacting the edges of said tubular section so as to assist in the forming operation.

6. The method as defined in claim 1 further including the step of positioning rubber gasketing material beneath said metallic ring and atop said flexible ribs prior to bending the extending portion of said ring.

References Cited

UNITED STATES PATENTS

| | | | |
|---|---|---|---|
| 1,915,318 | 6/1933 | Hothersall | 113—120 |
| 2,105,798 | 1/1938 | Tobiasson | 229—5.7 |
| 2,852,054 | 9/1958 | Motley | 150—.5 |
| 2,941,660 | 6/1960 | Tupper | 150—.5 X |
| 2,925,625 | 2/1960 | Souza | 264—320 |
| 2,972,781 | 2/1961 | Levy | 264—320 |
| 2,558,723 | 7/1951 | Ayres | 220—67 |
| 2,849,148 | 8/1958 | Lohuis | 220—67 |

FOREIGN PATENTS

| | | |
|---|---|---|
| 182,686 | 9/1905 | Germany. |
| 161,507 | 11/1957 | Sweden. |

CHARLIE T. MOON, *Primary Examiner.*